United States Patent
Chen et al.

(10) Patent No.: US 10,373,123 B2
(45) Date of Patent: Aug. 6, 2019

(54) EVENT SCHEDULING

(71) Applicant: Google LLC, Mountain View, CA (US)

(72) Inventors: Johnny Chen, Sunnyvale, CA (US); Thomas L. Dean, Los Altos Hills, CA (US); Gabriel Schine, Los Banos, CA (US); Qiangfeng Peter Lau, Mountain View, CA (US); Sudeep Gandhe, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/172,145

(22) Filed: Oct. 26, 2018

(65) Prior Publication Data
US 2019/0066060 A1    Feb. 28, 2019

Related U.S. Application Data

(63) Continuation of application No. 15/970,315, filed on May 3, 2018, now Pat. No. 10,140,595, which is a (Continued)

(51) Int. Cl.
*G06F 15/16* (2006.01)
*G06Q 10/10* (2012.01)
(Continued)

(52) U.S. Cl.
CPC ......... *G06Q 10/1095* (2013.01); *G06Q 10/00* (2013.01); *G06Q 10/06* (2013.01); (Continued)

(58) Field of Classification Search
CPC ...... G06Q 10/109; G06Q 30/02; G06Q 10/06; G06Q 50/01
See application file for complete search history.

(56) References Cited

U.S. PATENT DOCUMENTS 7,447,765 B2 * 11/2008 Aerrabotu ......... H04L 29/12009
                                                            709/224
7,593,740 B2      9/2009 Crowley et al.
(Continued)

FOREIGN PATENT DOCUMENTS

WO    2013/184298    12/2013

OTHER PUBLICATIONS

"Dodgeball (service)," from Wikipedia, the free encyclopedia, downloaded from the internet on Apr. 21, 2014, 2 pages http://en.wikipedia.org/wiki/Dodgeball (service).
(Continued)

*Primary Examiner* — Hieu T Hoang
(74) *Attorney, Agent, or Firm* — Fish & Richardson P.C.

(57) ABSTRACT

Methods, systems, and apparatus, including computer programs encoded on computer storage media, for determining other users that will attend an event with a user. One of the methods includes receiving, by a computer-implemented agent for a device, input from a user identifying an event, determining constraints for other users that will be invited to attend the event, determining one or more other users who meet the constraints, identifying, for each of the other users, other computer-implemented agents, each of the other agents for respective other devices, sending, to each of the other agents, a request to determine whether the respective other user of the other agent is interested in attending the event, receiving, from a first subset of the other agents, a response that indicates that the respective other user is interested in attending the event, and facilitating communication between the user and the respective other users.

20 Claims, 5 Drawing Sheets

Related U.S. Application Data continuation of application No. 15/223,267, filed on Jul. 29, 2016, now Pat. No. 9,965,748, which is a continuation of application No. 14/325,484, filed on Jul. 8, 2014, now Pat. No. 9,413,835.

(51) Int. Cl.
| | | |
|---|---|---|
| *G06Q 50/00* | (2012.01) | |
| *G06Q 10/06* | (2012.01) | |
| *G06Q 30/02* | (2012.01) | |
| *H04L 29/08* | (2006.01) | |
| *G06Q 10/00* | (2012.01) | |

(52) U.S. Cl.
CPC ........... *G06Q 10/109* (2013.01); *G06Q 30/02* (2013.01); *G06Q 50/01* (2013.01); *H04L 67/22* (2013.01); *H04L 67/306* (2013.01)

(56) References Cited

U.S. PATENT DOCUMENTS

| | | | |
|---|---|---|---|
| 2005/0125273 A1 | 6/2005 | Simons et al. | |
| 2005/0165762 A1 | 7/2005 | Bishop | |
| 2008/0091504 A1 | 4/2008 | Lyle et al. | |
| 2009/0083183 A1 | 3/2009 | Rao | |
| 2009/0193341 A1 | 7/2009 | Murray | |
| 2010/0325205 A1 | 12/2010 | Murphy et al. | |
| 2012/0084153 A1* | 4/2012 | Moreau | G06Q 30/02 705/14.66 |
| 2012/0323909 A1* | 12/2012 | Behforooz | G06F 16/24578 707/728 |
| 2014/0012926 A1 | 1/2014 | Narayanan et al. | |
| 2014/0047045 A1 | 2/2014 | Baldwin et al. | |
| 2014/0074483 A1 | 3/2014 | van Os | |
| 2014/0089418 A1 | 3/2014 | Davenport et al. | |
| 2014/0108333 A1 | 4/2014 | Jain | |
| 2014/0344355 A1 | 11/2014 | Gaucas | |
| 2015/0074191 A1* | 3/2015 | Feng | H04L 63/102 709/204 |

OTHER PUBLICATIONS

"Doodle Simplifies Scheduling", Doodle Group Scheduling, downloaded from the internet on Apr. 21, 2014, 1 page http://doodle.com/en/.

"Google Latitude", from Wikipedia, the free encyclopedia, downloaded from the internet on Apr. 21, 2014, 5 pages http://en.wikipedia.org/wiki/Google_Latitude.

"Meetup (website)," from Wikipedia, the free encyclopedia, downloaded from the internet on Apr. 21, 2014, 2 pages http://en.wikipedia.org/wiki/Meetup_(website).

Korjus, Olli, "Meeting Scheduling Assistant: Automatic scheduling between heterogeneous calendar systems", Master's Thesis, Espoo, Sep. 27, 2012.

International Search Report and Written Opinion in International Application No. PCT/US2015/038753, dated Oct. 1, 2015, 10 pages.

International Preliminary Report on Patentability in International Application No.PCT/US2015/038753, dated Jan. 10, 2017, 7 pages.

\* cited by examiner

EVENT SCHEDULING

CROSS-REFERENCE TO RELATED APPLICATION

This application is a continuation of U.S. application Ser. No. 15/970,315, filed May 3, 2018, which is a continuation of U.S. application Ser. No. 15/223,267, now U.S. Pat. No. 9,965,748, filed Jul. 29, 2016, which is a continuation of U.S. application Ser. No. 14/325,484, now U.S. Pat. No. 9,413,835, filed Jul. 8, 2014, the contents of which are incorporated by reference herein.

BACKGROUND

This specification relates to scheduling events for a user and determining other users that can attend some of the same events.

A computer-implemented agent may interact with a user to provide the user with an interface for features of a device on which the computer-implemented agent executes or with which the computer-implemented agent is associated. For example, a computer-implemented agent may execute on a mobile device, receive voice input from a user, and execute one or more actions in response to the voice input, such as retrieving search results responsive to the voice input and providing the search results to the user.

SUMMARY

In general, one innovative aspect of the subject matter described in this specification can be embodied in methods that include the actions of receiving, by a computer-implemented agent for a device, input from a user identifying an event which the user plans to attend, determining, by the agent, constraints for other users that will be invited to attend the event, determining, by the agent, one or more other users who meet the constraints, identifying, by the agent and for each of the other users, other computer-implemented agents, each of the other agents for respective other devices, sending, by the agent and to each of the other agents, a request to determine whether the respective other user of the other agent is interested in attending the event, receiving, by the agent from a first subset of the other agents, a response that indicates that the respective other user is interested in attending the event, and facilitating, by the agent and with the first subset of the other agents, communication between the user and the respective other users. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include identifying, by the agent, at least one of the first subset of other agents whose respective other user plans to attend the event, and scheduling, by the agent and the at least one of the first subset of other agents, a time slot for the event for the user and the other user. Scheduling the time slot for the event for the user and the other user may include determining a time and a location for the event without sharing any user's calendar information with any of the users. Scheduling the time slot for the event for the user and the other user may include determining a time and a location for the event, and reserving the time for the event in a calendar of the user. Scheduling the time slot for the event for the user and the other user may include prompting, by the agent, the user to determine whether the user plans to attend another event identified on the calendar of the user which conflicts with the time for the event, and receiving, by the agent, input indicating that the user will not attend the other event.

In some implementations, wherein facilitating communication between the user and the respective other users may include determining respective privacy settings for the user and each of the respective other users, and providing only information identified by a corresponding user as information that can be disclosed in a communication between the agent and the first subset of the other agents according to the respective privacy settings for the user and each of the respective other users. The method may include determining, by the agent using the respective privacy settings for the user, that the agent may provide one of the other agents in the first subset additional information about the user in a subsequent communication that the agent could not provide in a first communication sent prior to the subsequent communication. Determining that the agent may provide one of the other agents in the first subset additional information about the user in a subsequent communication that the agent could not provide in a first communication sent prior to the subsequent communication may include receiving, by the agent, input from the user indicating that the agent may provide the additional information to the one of the other agents in the first subset.

In some implementations, facilitating communication between the user and the respective other users may include, for a particular other user from the other users until the user and the other user agree to attend the event together or not, providing, by the agent, additional information about the user or the event to a particular other agent from the other agents that corresponds with the particular other user, and receiving, by the agent, other additional information about the other user or the event from the particular other agent. The additional information may include a job title for the user and the other additional information may include another job title for the particular other user. The additional information may include a name of an employer of the user and the other additional information may include another name of another employer for the particular other user. The additional information may include a name of a city in which the user works or lives and the other additional information may include another name of another city in which the particular other user works or lives.

In some implementations, wherein facilitating communication between the user and the respective other users may include facilitating communication about the event, the user, or the other users. Facilitating communication between the user and the respective other users may include facilitating, by the agent for each of the other agents in the first subset of the other agents, communication between only the agent and the respective other agent. Determining the constraints for the other users that will be invited to attend the event without receiving an identity for any of the other users from the user may include prompting, by the agent, the user for the constraints, and receiving, by the agent, input from the user identifying the constraints. Determining the constraints for the other users that will be invited to attend the event without receiving an identity for any of the other users from the user may include identifying a profile for the user that defines the constraints.

In some implementations, determining, by the agent, constraints for other users that will be invited to attend the event may include determining, by the agent, constraints for other users that will be invited to attend the event without receiving an identity for any of the other users from the user. Determining, by the agent, the one or more other users who meet the constraints may include determining, by the agent, the one or more other users who meet the constraints without revealing an identity for any of the other users to the user. The constraints may be specific to the event, a type of the event, or all events for the user.

The subject matter described in this specification can be implemented in particular embodiments so as to realize one or more of the following advantages. In some implementations, computer-implemented agents may introduce people, who may not know each other, without revealing a person's identity to the other people and while maintaining the each person's privacy, e.g., as defined by respective privacy settings for each person. In some implementations, computer-implemented agents schedule a time and a location for an event while not revealing information from calendars of other users to a respective user to maintain the privacy of each of the users, e.g., except that the scheduled time and the scheduled location are revealed to all of the users.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1A:
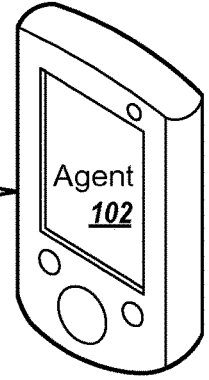
FIG. 1A is an example of an environment in which a computer-implemented agent schedules an event for a user.
Figure 1A:
Figure 1A:
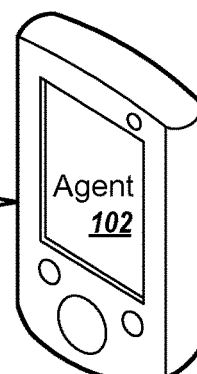

A user may want to schedule an event without providing all of the event details or the user's identity to people invited to attend the event. A computer-implemented agent, executing on a device operated by the user, may act as a collaborative intermediary for the user and receive input from the user describing the event, such as a date and event type, and potentially constraints for the types of people the user would like to invite.

A computer-implemented agent is a software service, executing on a user device or a server, that provides a user with a voice interface. The computer-implemented agent may act a particular way depending on past interactions with the user, settings, e.g., specified by a programmer or a user, or custom commands, e.g., specified by the user. The computer-implemented agent may have a particular style of speech, e.g., specific interactions to take or ways the agent responds to particular situations with the user, a particular voice, e.g., sound of speech, or a particular language, e.g., as text-to-speech parameters.

The computer-implemented agent uses the input received from the user to find other computer-implemented agents, for devices operated by other users, that each indicate that their respective other user meets the user's constraints and is interested in attending the event. The computer-implemented agent and the other computer-implemented agents may interact to introduce the user to the other users, and potentially some of the other users to each other, without revealing the identity of any of the users until a respective agent explicitly receives a user's permission to share her identity. Each of the agents may use respective privacy settings for the respective user to ensure that the respective user's privacy is maintained and predictable.

For example, the agents may share their respective user's interests to determine common interests between two or more of the users and provide their respective user with information indicating that another user who may attend the event has a particular common interest. Two of the agents may determine that their respective users, potentially including the user who initially created the invite, both like soccer, hiking, or a particular sports team and share that common interest with their users: "Another person who may attend the event likes soccer."

The agents may provide additional details about their respective users to the other agents, based on settings identified by their respective user or using input received from their respective user, until their respective user indicates that they do not want to attend the event, e.g., by not responding to a prompt for additional details, or that they do want to attend the event, e.g., and that the agent may share the user's identity with the other agents.

The agents that receive an indication from their respective users that the user wants to attend the event may coordinate scheduling of the event. For instance, if the event is watching a movie, the agents may determine a particular movie that all of the users want to watch and a time that works for all of the users to attend the particular movie, e.g., without sharing any of the user's availabilities with the other users.

In examples when the event is for a particular movie, the agents may determine show times for the particular movie and times when all of the users who want to attend the movie are available and schedule the event at a time that works for all of the users, or a majority of the users when a time slot that works for all of the users is not available.

The scheduling of the event may include determining a location for the event. For example, the agents may find a movie theater that is showing the particular movie at a time that works for all of the users, e.g., taking travel time for each of the users into consideration. In some examples, the agents may find a movie theater that is centrally located, e.g., with respect to where each of the users work or live, and schedule the event at that movie theater.

Example Operating Environment

FIG. 1A is an example of an environment 100 in which a computer-implemented agent 102 schedules an event for a user 104. The event may be a specific type of event, such as a movie described here, a specific event, such as a particular showing of a specific movie or any showing of a specific movie, or may be general, such as an event in which to participate on a particular day of the week, e.g., when the user 104 can get together with friends or new acquaintances to socialize.

The agent 102 may be a computer-implemented conversational agent that interacts with the user using voice input and output on a user device. For instance, the user device may receive a digital representation of speech that encodes an utterance spoken by the user 104, transcribe the utterance using the digital representation of speech, and provide the transcription to the agent 102. The agent 102 uses the transcription to determine a response to the utterance and uses text-to-speech data to generate an audible version of the response to provide to the user, e.g., using a speaker.

In some examples, the agent 102 receives input and provides output using a display. For instance, the agent may receive input from a keyboard application, e.g., included in the user device, and provide text output on a display of the user device. The agent 102 may use any appropriate algorithm to receive input from and provide a response to the user 104.

In one example, the user 104 may ask the agent 102 to "find some people who will go to a movie" with the user 104. The agent 102 may identify predetermined constraints for the event, e.g., specified by user settings, or may ask the user 104 whether the user has "any constraints for who goes to the movie" with the user 104. The agent 102 determines the constraints, such as by receiving voice input from the user 104 indicating that the user would like to go to the movie with "people in the Minneapolis area in their 30s and 40s."

The agent 102 uses the constraints to determine other users who may attend the event with the user 104. For instance, the agent 102 communicates with other agents, each of which is associated with another user and a device operated by that other user, and determines that 1,213 other users meet the user's constraints, e.g., that 1,213 other users live in Minneapolis, are in their 30s or 40s, and match the user's predefine constraints specified by user settings or a user profile. In some examples, the agent 102 uses both predetermined constraints and constraints indicated by the user during the conversation process, e.g., shown in the environment 100, only predetermined constraints, or only constraints indicated by the user during the conversation process. The predetermined constraints may be specific to a single event, a type of event, or all events for the user. The predetermined constraints may be stored in a database or a memory of a device that executes the agent 102 or another device.

The agent 102 communicates with other agents of the determined other users to determine which of those other users are interested in going to the movie, e.g., with the user given the information currently provided to those other users, such as a time or date for the movie. In the example shown in FIG. 1A, the agent 102 determines that five other users are interested in going to the movie and informs the user 104 that the agent 102 "found five people who meet your preferences and are interested in going to the movie."

The user 104 may instruct the agent 102 to schedule the movie with the five other users. In response, the agent 102 communicates with the other agents each of which are associated with one of the five other users to determine a time for the movie, and potentially a theater at which to watch the movie, assuming that the user's preferences do not indicate a preferred theater. During this communication process, some of the other agents may determine that their respective other user is unable to attend the movie, e.g., due to time or location constraints. For instance, one of the other users may not be able to attend the movie at the user's preferred theater and that user's agent informs the agent 102 that the one of the other users cannot go to the movie, while neither of the agents release the identity of the one of the other users to the agent 102 or the user 104 to the other agent.

Alternatively, the agent 102 may begin an iterative process of revealing more details about the user to the five other users, and receiving additional details about the five other users from the respective other agents and providing those additional details to the user 104. For instance, the user 104 may instruct the agent 102 to let the other users "know that I am a Senior Buyer at Widget Co.," potentially in response to a prompt from the agent 102 or using user settings. The other users may use the additional information, such as the name of the company at which the user 104 works, to determine whether they want to go to a movie with the user 104.

The additional information can include interests of some of the users such that a person may be more likely to go to a movie or an event with someone who has one or more common interests than an event with someone with whom they have no interests in common. For example, a person may be more likely to go to a movie about soccer with another person who also likes soccer compared to a different person who doesn't like sports. In some examples, a person may be more likely to go to a movie with someone with whom they can network, e.g., about school or business, compared to someone who works in a completely different field.

Returning to the example shown in FIG. 1A, the agent 102 provides the additional information received from the user 104, e.g., that the user 104 is a Senior Buyer at Widget Co., to the other agents for the five other people interested in going to the movie and communicates with those other agents and finds a Sales Supervisor who plans to go to the movie with the user. The agent 102 then informs the user that "a Sales Supervisor at Acme Inc. plans to go to the movie." In response, the user 104 may instruct the agent 102 to "schedule the movie with the Sales Supervisor."

The agent 102 communicates with the other agent for the Sales Supervisor to determine a time and a location at which the user 104 and the Sales Supervisor may attend the movie. The agent 102 and the other agent for the Sales Supervisor add the movie to the calendars of their respective users.

Figure 1B:
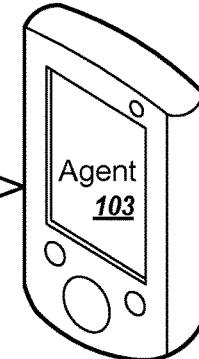
FIG. 1B is an example of another environment in which another computer-implemented agent schedules an event for another user 105.
Figure 1B:
Figure 1B:
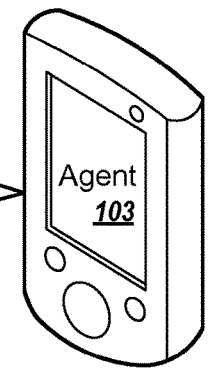

FIG. 1B is an example of another environment 101 in which another computer-implemented agent 103 schedules an event for another user 105. For instance, the other computer-implemented agent 103 may communicate with the computer-implemented agent 102, described with reference to FIG. 1A, to schedule a time for the other user 105 and the user 104 to attend a movie.

For example, when the computer-implemented agent 102 sends a message to the other computer-implemented agent 103 indicating that the user 104 plans to attend a movie, is looking for other users to attend the movie, and the constraints of the user 104, the other computer-implemented agent 103 may determine that the other user 105 meets the constraints of the user 104. The other computer-implemented agent 103 prompts the other user 105 to indicate that "a person is looking to find someone like you to go to a movie tonight. Are you interested in going with this person?"

The other computer-implemented agent 103 may determine that a calendar for the other user 105 indicates that the other user 105 plans to attend a movie, e.g., the same day as the user 104, and include additional information, e.g., "I know that you were planning on going to a movie tonight," in the prompt. In some implementations, the other computer-implemented agent 103 may include the additional information in the prompt when a calendar entry in the other user's 105 calendar indicates that the other user 105 plans to attend a movie and does not indicate a particular movie. In some examples, the other computer-implemented agent 103 may include the additional information in the prompt when the calendar entry indicates a particular movie that the other user 105 plans to attend to determine whether the user 104 may attend the particular movie or if the other user 105 is willing to watch a different movie than originally planned, e.g., if the user 104 does not want to watch the particular movie.

The other computer-implemented agent 103 may receive input from the other user 105 indicating that the other computer-implemented agent 103 should "go ahead and get more details" about the movie event and to "let the person know I might be interested" in attending the movie.

The other computer-implemented agent 103 provides the computer-implemented agent 102 with a message that indicates that the other user 105 is interested in attending the movie but would like additional details about the movie event, e.g., a specific movie the user 104 plans to watch, a time or location for the movie, or information about the user 104. In this example, the other computer-implemented agent 103 receives a response from the computer-implemented agent 102 that indicates that the user 104 is a Senior Buyer at Widget Co. and informs the user that "I let the person's agent know. By the way, the person is a Senior Buyer at Widget Co."

The other computer-implemented agent 103 may receive a response from the other user 105 instructing the other computer-implemented agent 103 to "go ahead and tell the person about my job and that I'll go to the movie if they still want to go." The other computer-implemented agent 103 may use a profile or other data for the other user 105 to determine information about the other user's 105 job, such as his job title, employer, or a city in which he works, and provide some of that information to the computer-implemented agent 102, e.g., that the other user 105 is a Sales Supervisor at Acme Inc.

In some implementations, the other computer-implemented agent 103 may use a user profile and privacy settings for the other user 105 to determine what data to share with the computer-implemented agent 102. For example, the other computer-implemented agent 103 may determine what information has already been shared with the computer-implemented agent 102, what information should be shared with the computer-implemented agent 102 based on a quantity of communications with the computer-implemented agent 102, e.g., the particular iteration of communications, or both.

The other computer-implemented agent 103 and the computer-implemented agent 102 communicate to determine a time or a location for the movie or which particular movie to watch, or any combination of two or more of these. In some examples, the other computer-implemented agent 103 may use details for an event which the other user 105 planned to attend when determining the time, the location, or the particular movie. The other computer-implemented agent 103 may use a user profile for the other user 105, or other data associated with the other user 105, such as a text message sent by the other user 105 indicating that the other user 105 is interested in watching the particular movie, when determining the time, the location, or the particular movie. The other computer-implemented agent 103 may prompt the other user 105 for input regarding the time, the location, or the particular movie.

The other computer-implemented agent 103 informs the other user 105 that the scheduling of the movie is "all set. I've talked to the other agent, and given your current location and the other person's we recommend the Central Cineplex." The other user 105 may then tell the other computer-implemented agent "Great. I'll be there at seven," e.g., when the other user's 105 calendar entry for watching a movie that evening is for seven.

Example System

Figure 2:
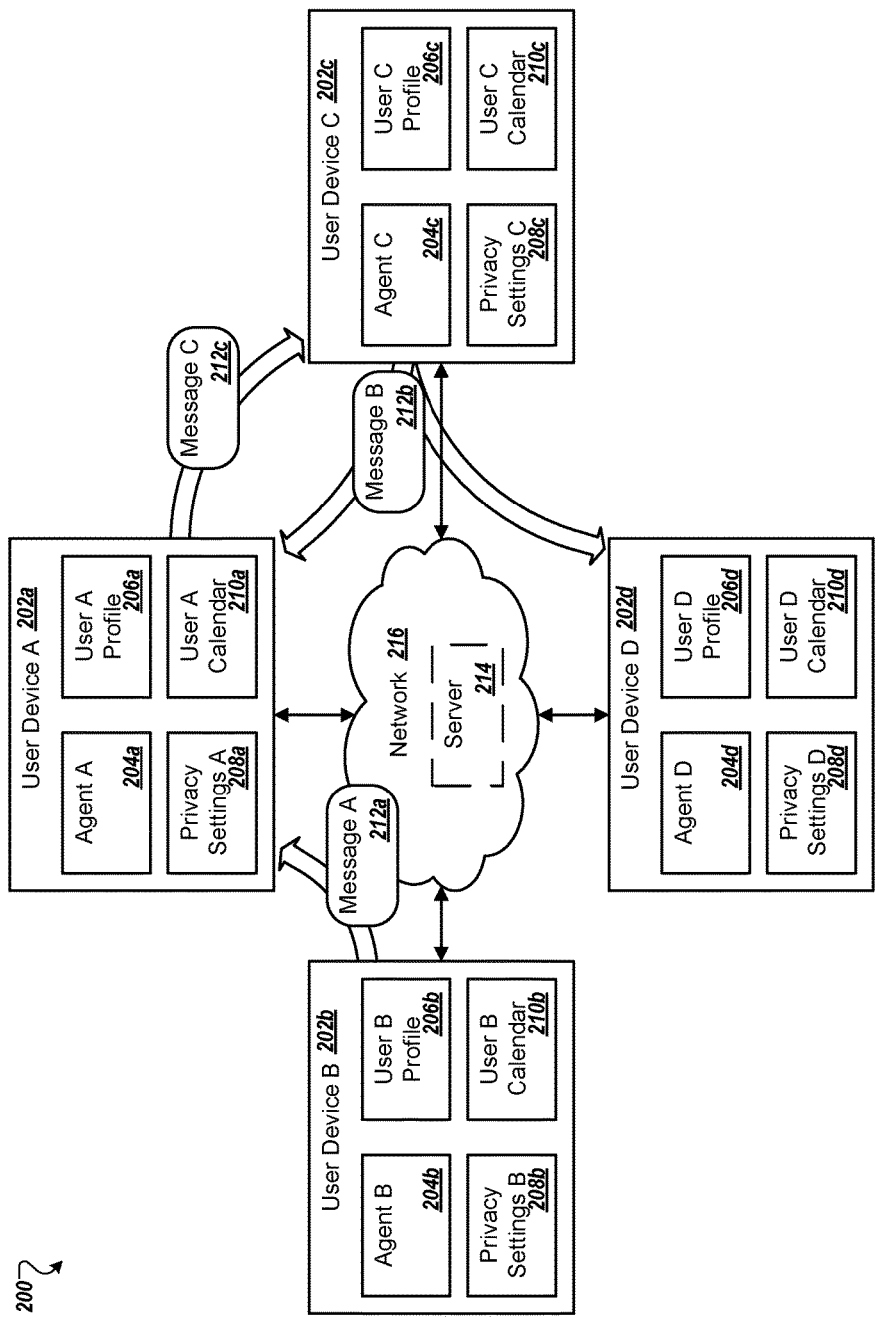
FIG. 2 is an example of a system in which computer-implemented agents for multiple user devices schedule a time for an event for the respective users of the user devices.

FIG. 2 is an example of a system 200 in which computer-implemented agents for multiple user devices 202a-d schedule a time for an event for the respective users of the user devices 202a-d. As described in more detail below, the users may or may not know some of the other users and may or may not know that some of the other users are invited to the event but the agents to not release the identity of their respective user until their respective user indicates that the agent may release information about the user's identity or respective privacy settings indicate that the agent may release information about the user's identity.

For example, a user A of the user device A 202a may instruct his agent A 204a, e.g., a digital assistant or conversational agent, to coordinate an event, e.g., an activity such as a meeting or dinner, with a specific set of other users, e.g., the users of the user devices B-D 202b-d. The specific set of other users may be identified by name, e.g., user B, user C, and user D, or by group, e.g., the user A's immediate family members or friends that the agent A 204 determines using contact information or in social media information. The agent A 204a contacts the other agents B-D 204b-d and informs the other agents that the user of the user device A 202a wants to schedule the event with certain constraints.

The agent A 204a may determine the constraints for the event using a user A profile 206a for the user of the user device A 202a or by prompting the user A for the constraints. Some examples of constraints include a physical or virtual location for the event, a time of day, a particular day or day of week for the event, that the event occurs by a specific date, the duration of the event, the type of activity, e.g., a meeting or hiking, etc. For instance, a preferred time of day, day of week, or event duration may be predetermined, e.g., specified in the user A profile 206a, while the particular day of the event or a day by which the event should occur may be received from the user A of the user device A 202a, e.g., with the event request or in response to a prompt from the agent A 204a.

The other agents B-D 204b-d may use the constraints to determine whether or not their corresponding users are able to attend the event. For instance, the agent B 204b may ask its user whether or not they would like to attend the event and provide the agent A 204a with a message A 212a that indicates the user B's response.

Another agent, for example agent D 204d, may compare the constraints received from the agent A 204a with the user D profile 206d, a user D calendar 210d, or both, to determine whether the user D may attend the event. For example, when the constraints include a particular time, date, or both, the agent D 204d may determine that the user D cannot attend the event because of other commitments, e.g., identified in the user D calendar 210d.

In some examples, the agents may resolve conflicts between constraints and schedules. For example, when the user D calendar 210d indicates that the user D may not be able to attend the event, the agent D 204d may prompt the user D to determine whether or not the user D plans to attend a scheduled event or may be able to attend the event with the user A. For instance, the agent D 204*d* may determine that the user D sometimes, or often, does not attend a particular event identified on her calendar, e.g., using user history data, and prompt the user D to determine whether she will attend the particular event or may attend the event with the user A instead. When the user D indicates that she is likely to attend the particular event and not the event with the user A, the agent D 204*d* notifies the agent A 204*a* that the user D will not attend or doesn't send any response to the agent A 204*a*. When the user D indicates that she is not likely to attend the particular event and may attend the event with the user A, the agent D 204*d* notifies the agent A 204*a* that the user D may attend the event, depending on additional information about the event, etc., as described in more detail below.

In some instances, one of the agents B-D 204*b-d* may prompt their corresponding user to determine whether the user wants to attend the event with the user A, e.g., without revealing the user A's identity, and, in response, receive a request for additional information about the event from their respective user. The respective agent B-D 204*b-d* requests additional information from the agent A 204*a*. The agent A 204*a* may prompt the user A for the additional information, or may determine that the additional information is available to the agent A 204*a*, e.g., in the user A profile 206*a* or a user history, that privacy settings A 208*a* for the user A indicate that the agent A 204*a* may share the additional information, and provide the additional information to the requesting agent B-D 204*b-d* that then presents the additional information to the respective user.

The agents A-D 204*a-d*, for the users who indicated that they may attend the event with the user A, schedule the event, if the event request from the user A did not include a specific time, day, location, or any combination of two or more of those. The agents A-D 204*a-d* may prompt their respective user for information about what time or location works, or may use the respective user profile 206*a-d*, user history data, or user calendars 210*a-d*. The agents A-D 204*a-d* determine a time that works for the users A-D that will attend the event without sharing calendar information for the other users with their respective user. For instance, the agent A 204*a* may prompt the user A to determine whether Friday at 6 PM works to watch a movie without indicating that the user B has a meeting until 5:30 PM that Friday or that the user C is unable to attend because of previous commitments that Friday evening.

Once the event is scheduled, the agents A-D 204*a-d*, for the users who indicated that they may attend the event with the user A and who are available during the scheduled time, add the event to their respective user's calendar. For example, the agents A-D 204*a-d* may determine that users B, C, and D want to attend the event with the user A but that user C is unable to attend, e.g., due to previous commitments, and that another time or day will not work better for the user C, and schedule the movie for Friday at 6 PM on the calendars for the users A, B, and D.

In another example, the user A may ask the agent A 204*a* to introduce the user A to other users, who the user A may not know and does not specify, that may attend an event with the user A. For instance, the user A may ask the agent A to find other users who will watch a movie, e.g., a specific movie or any movie, with the user A. The other users may include a person from the user A's network of friends or social circle or a person with whom the user A is not connected, e.g., but may have a common interest in a particular activity, hobby, occupational field, etc. The other uses may include friends of the user A's friends or family, a person who works for the same organization or entity with which the user A works, e.g., but might not know, or a person who attends a group with the user A, e.g., a technical group, a church, class, association, etc.

In this example, the user C informs the agent C 204*c* that she plans to watch a movie, e.g., and may potentially include constraints for the movie, such as a particular movie name, time, location, or any combination of two or more of those. The agent C 204*c* prompts the user C whether she would like the agent C 204*c* to find someone with which the user C can watch the movie. The agent C 204*c* may then receive input from the user C indicating constraints for other users with which she would watch the movie, such as someone the user C knows, e.g., without specifying a particular name but potentially specifying a particular group or circle of friends, or that the agent C 204*c* should find someone the user C communicates with at least once a month or someone the user C has spent time with before, e.g., according to a user history for the user C, the user C calendar, or the user C's contacts on the user device C 202*c*.

The agent C 204*c* uses the constraints for the movie to determine other users who match the user C's constraints. The agent C 204*c* may communicate with the other agents A-D 204*a-d* in the system 200 to determine the other users who match the user C's constraints. The agent C 204*c* may send a message to all of the other agents A-D 204*a-d* in the system 200 to determine whether the other agents' respective user meets the constraints of the user C. In some examples, the agent C 204*c* may communicate with a server 214 that includes user profile data for the users A-D to determine which of the other users match the user C's constraints.

For instance, the agent C 204*c* may request data from the server 214 identifying the agents for the users who match the user C's constraints, given the information available to the server 214. When the user C's constraints include that the agent C 204*c* should find someone with whom the user C has previously spent time, the agent C 204*c* may be able to determine a list of all users that match this constraint using a user history for the user C or the server 214 may include a user history for the user C and determine the list of all users that match this constraint.

In some examples, whether or not another user meets a particular constraint may only be determined by the agent C 204*c* or the other user's agent. For example, when a constraint indicates a particular day and time for the movie, the other user's agent may be able to determine whether the other user meets this constraint while the server 214 cannot, e.g., when the server 214 does not have access to the other user's calendar. In some examples, the server 214 is able to determine whether each of the other users meets all of the constraints specified by the user C.

The agent C 204*c* sends a message to each of the other agents A-D 204*a-d* to determine whether the other agents' respective user would like to attend the movie with the user C without revealing the user C's identity. The message that asks whether the other users would like to attend the movie may be the same message sent to the other agents A-D 204*a-d* that determines whether the respective other user meets the user C's constraints. Each of the other agents A-D 204*a-d* provides a prompt to their respective user, e.g., on a display of the respective user device or audibly, to determine whether the user may attend the movie with the user C. The prompt may indicate that the user C who is scheduling the movie event is someone that the user viewing the prompt knows, or other information about the user C such as some of the user C's hobbies, without revealing the user C's identity, e.g., name, or alias.

The other agents A-D 204a-d may receive input from their respective user indicating that the user may attend the movie with the user C and, in response, provide the agent C with a message indicating that the respective other user may attend the movie, and may include the other user's name or information identifying the other user. For example, the agent C 204c may send a message B 212b to the agents A and D to determine whether the users A and D would like to attend the movie, when the users A and D match constraints provided by the user C and the user B does not. The agent A 204a may respond with a message C 212c requesting additional information about the movie or the user C and the agent C 204c may send the agent A 204a the name of the movie, the name of a theater at which the user C will watch the movie, or a list of activities the user C enjoys, e.g., and about which both users may talk. The agent A 204a then provides the additional information to the user A, e.g., via audible or visible output, and may receive a response from the user A indicating that the user A intends to watch the movie with the user C.

In some examples, the agent C 204c may provide the same additional information to multiple other agents at the same time. For instance, the agent C 204c may send the message B 212b with the name of the movie or the location of the theater to the agent A 204a and the agent D 204d.

In some examples, a response from another agent may be provided to multiple agents. For instance, the agent A 204a may receive permission to disclose the user A's occupation, explicitly from the user A or using the privacy settings A 208a, and provide a message to the agents C-D 204c-d that identifies the user A's occupation. The information shared by an agent is sent to the agents for the users that may attend the movie, e.g., and is not sent to the other agents in the system 200 for the users that do not plan to attend the movie.

The communication between the agents A-D 204a-d may be an iterative process where additional information is gradually revealed about the users that may attend the movie. A first iteration may disclose the types of movies each of the users may want to watch, e.g., and be used to determine a specific movie for an event. A second iteration may disclose common interests of the users who may still attend the movie, e.g., and did not express that they are no longer interested in attending the movie during the previous iteration. And a third iteration may disclose the users' employers or places the users recently went for vacation.

During each of the iterations, the agents A-D 204a-d confirm with their respective user whether the respective agent has the user's permission to share additional information, the type of additional information that may be shared, the specific information that the agent should provide to the other agents, or any combination of two or more of those. One or more of the agents A-D 204a-d may use respective privacy settings A-D 208a-d to determine whether the respective agent has the user's permission.

The agents A-D 204a-d may confirm with their respective user whether or not the user may still attend the movie. For instance, the user C may be interested in seeing an action movie and the agent C 204c provides the agents A and D with the message B 212b indicating that the movie will be an action movie after an initial message to determine which users may be interested in seeing a movie with the user C. The agent D 204d may then receive input from the user D indicating that the user D is no longer interested in watching a movie with the user C, and stop participation in the scheduling of the movie with the agent C 204c.

In some examples, the user D may indicate that they would prefer seeing a drama movie and not an action movie. The agent D 204d may send a message to the agent C 204c indicating that the user D will see a drama movie but not an action movie. The agent C 204c may then determine whether the user C will watch a drama with the user D instead of an action movie. The agent A 204a may also participate in the communication with the agents C-D 204c-d to determine the type of movie for the event, e.g., for situations where the user A may want to watch an action movie but not a drama.

The agents may communicate with the other agents 204a-d and present information to their respective user without disclosing the identity of any of the other users to their user. For instance, the agent C 204c may indicate that another user would like to see a drama movie but not an action movie without sharing the identity of the user D. In some examples, the agent C 204c may indicate that one other user would see an action movie, but not a drama, and another user would see a drama but not an action movie. In this example, the agent C 204c presents the user C with information to allow the user C to decide what type of movie to select for the event without knowing who would attend for the particular type of movie selected. The presentation may include non-identifying information, such as a hobby or occupation of the user who wants to see the action movie and some education background of the user who wants to see the drama.

The respective agents A-D 204a-d, for the users who have indicated that they plan to attend the movie, schedule a time, day, location, or any combination of two or more of those for the movie. The scheduling may include sharing of calendar information between the respective agents A-D 204a-d without sharing the calendar information with the users, e.g., so that each of the users does not know details about the other users' availability. The scheduling may include an agent creating an appointment on the respective user's calendar for the movie.

Prior to scheduling the movie, the respective agents may share information that indicates the identity of the users. For instance, when the user A, the user C, and the user D all indicate that they may attend a movie, the users' respective agents may share the user's name with the other agents, and the other agents may present the name to their respective user, e.g., audibly or visually. When multiple other users are attending an event, an agent may present all of the other users' names to its respective user at the same time. For example, the agent C 204c may indicate that both user A and user D plan to attend the movie.

When an agent schedules the movie, e.g., on a user's calendar, the agent may confirm that the respective user plans to attend the movie. For example, the agent D 204d may prompt the user D visually to confirm that she plans to attend the movie with the user C.

One or more of the agents A-D 204a-d may execute on the respective user device A-D 202a-d in part or entirely. One or more of the agents A-D 204a-d may execute, in whole or in part, on the server 214 or another server. When one of the agents executes solely on the server 214, the agent is associated with the respective user device, e.g., using a respective device identifier or an account of the respective user.

Some of the user profiles 206a-d, the privacy settings 208a-d, the user calendars 210a-d, or any combination of two or more of these may be stored on a server, such as the server 214. For example, the user device A 202a may execute the agent A 204a and include the privacy settings A 208a in a memory while the user A profile 206a and the user A calendar 210a are stored on the server 214. The server 214 may include one or more computers.

The user devices 202a-d may include personal computers, mobile communication devices, and other devices that can send and receive data over a network 216. The network 216, such as a local area network (LAN), wide area network (WAN), the Internet, or a combination thereof, connects the user devices 202a-d and the server 214.

Example Process Flow

Figure 3:
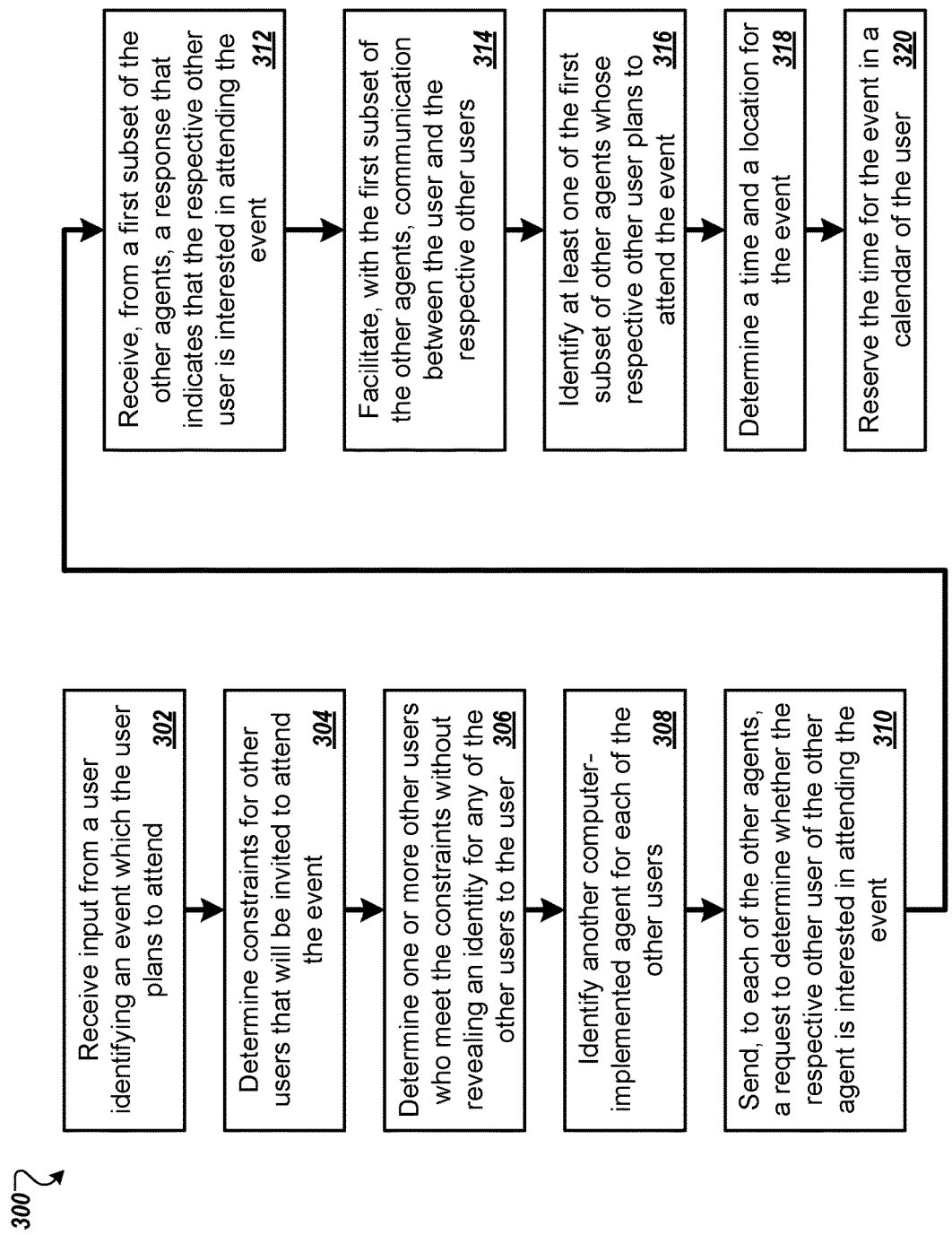
FIG. 3 is a flow diagram of a process for scheduling a time for an event on a user's calendar.

FIG. 3 is a flow diagram of a process 300 for scheduling a time for an event on a user's calendar. For example, the process 300 can be used by the computer-implemented agent 102 from the environment 100.

The process receives input from a user identifying an event which the user plans to attend (302). The event may be a movie, a meeting, a dinner event, or a hiking event to name a few examples.

The process determines constraints for other users that will be invited to attend the event (304). The constraints may indicate common interests for the user and the other users. The constraints may indicate characteristics of the other users, such as an age, occupation, city where the respective other users live or work, etc. In some examples, the agent receives the constraints from the user without receiving an identity for any of the other users from the user.

The process determines one or more other users who meet the constraints without revealing an identity for any of the other users to the user (306). For instance, the agent communicates with a server or other agents, or both, to determine the other users.

In some examples, some of the constraints may be optional. For example, the user may indicate that they would like to go to a movie with someone who lives in Minneapolis or Saint Paul. In one example, a constraint may indicate that the user would like to attend the movie with someone who works at Widget Co. but that the user is willing to go to the movie with someone who does not work at Widget Co. In this example, the agent may first determine whether another user at Widget Co. meets all of the user's constraints, and potentially whether the other user is able to go to the movie with the user, e.g., by performing steps 308 through 320, before determining whether a different user, who does not work at Widget Co., is able to go to the movie with the user.

In some implementations, the agent may reveal the identity of the user to one or more of the other users. For example, when the agent is scheduling a meeting between the user and the other users, the agent may share the name of the user with the other users, e.g., without sharing the names of the other users with each other, and schedule a time slot for the meeting. In this example, the agent might not share the user's calendar availability with the other users but only with the other users' respective agents, e.g., when determining a time for the meeting during step 318.

The process identifies another computer-implemented agent for each of the other users (308). For instance, when the agent communicates with the server to determine the other users who meet the user's constraints, the agent may request an identifier for each of the other agents from the server. The identifiers may be for other agents that each execute on the server, or for other agents that execute on respective user devices, e.g., such as addresses of those devices, or both. The server may store a database that includes user profile information, e.g., used to determine whether the other users meet the user's constraints, that associates each user profile with an identifier of the respective agent.

When the agent communicates directly with other agents to determine the other users who meet the constraints of the user, the agent may determine the other agents during this communication process. For example, the agent may send a message to the other agents to determine whether the respective user of each of the other agents meets the user's constraints. When one of the other agents' users meets the constraints, the respective other agent sends a message to the agent indicating that the other user meets the constraints. For other agents whose respective users do not meet the user's constraints, those other agents may or may not send a message to the agent indicating that the respective user does not meet the user's constraints.

The process sends, to each of the other agents, a request to determine whether the respective other user of the other agent is interested in attending the event (310). The request to determine whether the respective other user is interested in attending the event may be included in the same message as a request sent to the other agents to determine whether the respective other user meets the constraints of the user. The message may include details of the event, such as the name of a movie and a theater at which the user plans to watch the movie, depending on the information the agent receives from the user, e.g., during step 302. The requests may be sent to only the agents whose corresponding users meet the user's constraints.

The process receives, from a first subset of the other agents, a response that indicates that the respective other user is interested in attending the event (312). The other agents each provide their respective users with a prompt, either audible or visible, asking whether the user may attend the event. The agent receives responses from some of the other agents, as the first subset, that each indicates that the respective other user plans to attend the event.

The process facilitates, with the first subset of the other agents, communication between the user and the respective other users (314). For instance, the agent communicates with each of the other agents in the first subset in an iterative process that provides the respective users with additional details about the event, the users who may attend the event, or both. The communication may be between one of the agents in the first subset and the agent or multiple agents in the first subset and the agent. For instance, the agent may provide information about the user's occupation to a first other agent, e.g., in response to receipt of information about another user's occupation from the first agent, and may provide more details about the event to all of the agents in the first subset, either including the first other agent or not since the first agent received details about the user's occupation.

In some implementations, the communication may be between two or more of the agents in the first subset. For example, the agent may determine that the user is no longer able to attend the event but some of the other users still plan to attend the event, e.g., a movie, and the other agents may continue to schedule the event and iteratively release more details about their respective other users, the event, or both.

The process identifies at least one of the first subset of other agents whose respective other user plans to attend the event (316). For example, the agent determines that users for five of the ten other agents in the first subset indicated that they plan to attend the event.

The process determines a time and a location for the event (318). The agent communicates with the at least one of the agents in the first subset whose respective user plans to attend the event to determine the time and the location for the event. One or both of the time and the location may have been previously defined by the user, e.g., in the user's constraints. The agents communicate without providing their respective user with information from the other users' calendars, except for the determined time and the determined location of the event or to prompt their respective user about the user's availability to attend the event at a particular time or a particular location.

The process reserves the time for the event in a calendar of the user (320). The agent and the at least one of the agents in the first subset each create an appointment on their respective user's calendar for a time slot represented by the determined time. The appointment may include information representing the determined location for the event. The appointment may include information indicating the other users that plan to attend the event.

The order of steps in the process 300 described above is illustrative only, and scheduling the time for the event on the user's calendar can be performed in different orders. For example, the agent may identify the other agents, e.g., step 308, prior to determining the other users for the respective other agents, e.g., step 306.

In some implementations, the process 300 can include additional steps, fewer steps, or some of the steps can be divided into multiple steps. For example, the agent may schedule a time slot for the event for a time and a location specified by the user without communicating with the other agents to determine the time or location.

Optional Implementation Details

In some implementations, during the communication between the agent and the other agents, the agent may determine that additional information about the user may be provided in a subsequent communication that the agent could not provide in a first communication prior to the subsequent communication. For instance, the agent may determine that user privacy settings indicate that the agent should reveal additional information about the event during the first three rounds of communication prior to providing any details about the user, such as the user's occupation, where the user lives or works, or some of the user's hobbies. In this example, after the first three rounds of communication, the agent may reveal details about the user.

In some examples, the agent may receive input from the user indicating that the agent may provide the additional information, which the agent could not previously provide, to another agent. For example, the agent may prompt the user for the additional information or ask the user whether the agent may reveal the agent's occupation to another user, e.g., via a respective other agent for the other user.

In some implementations, the agent may reveal some information about an event during an initial communication but not all information about the event. For instance, the agent may receive input from the user indicating that the user wants to see a new action movie that comes out on Friday at the 6 PM showing. The agent may identify other agents for other users who are available Friday night, or have another commitment which the respective other user might not attend, and sends a message to those other agents to determine whether the respective other user may want to go to a movie Friday night. One or more subsequent communications between the agent and the other agents, for those other users who indicated that they are interested in attending the movie, may reveal that the movie is an action movie, that the movie will be released on Friday, that the user plans to attend the 6 PM showing of the movie, the name of the movie, or any combination of two or more of those.

In some implementations, an agent may schedule events for multiple different users. For example, when multiple different users operate the same user device, e.g., a smart phone, the agent may create respective profiles for each of the users, store separate user history data for each of the users, and have access to a calendar for each of the users.

In these implementations, when one of the users requests that the agent schedule an event, the agent may use the data for the other users that operate the same device to determine if one of the other users may want to attend the event. For instance, the device may be a public computer in a library or a school and the users may not know each other. The agent may determine that some of the other users may be interested in attending the event and provide each of the other users with a prompt asking whether the other user would want to attend the event, e.g., upon determining that the respective other user is operating the device based on the other user's login credentials or another method.

In some examples, an agent for multiple users may receive a request from another agent asking whether a user may want to attend an event with another user. The agent may determine for each of the multiple users whether the user may be interested in attending the event, the user meets any constraints defined by the other user, the user is able to attend the event, or any combination of two or more of these. The agent may send the other agent a single message that indicates a subset of the multiple users that plan to attend the event with the other user or may send one message for each user in the subset of the multiple users.

In some implementations, an agent may receive a request for a particular type of event without receiving constraints from the user who provided the request. The agent may determine constraints for people to invite to the event based on the type of event or the particular event. For example, the agent may receive a request from a user stating that "I want to have a meeting to talk about Project X. Please find folks who should be in that meeting." The agent may determine potential participants for the event using data that indicates people who are assigned to work on Project X, involved in the development of Project X, or may use a product developed from Project X. The data that indicates the potential participants may be stored on a server, e.g., the server 214 or another server, that includes a mapping of people, e.g., employees, to projects or tasks to which they are assigned.

Communications between the requesting user and the potential participants can include discussion topics for the meeting. For instance, potential participants of the meeting can ask the requesting user about the purpose, scope, and/or potential outcome of the meeting.

In some examples, the potential participants may propose or alter an agenda or subject of the meeting. For example, a potential participant can send a message to the requesting user and/or other potential participants indicating that "I think we should examine whether we should do project X at all."

Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive event information from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
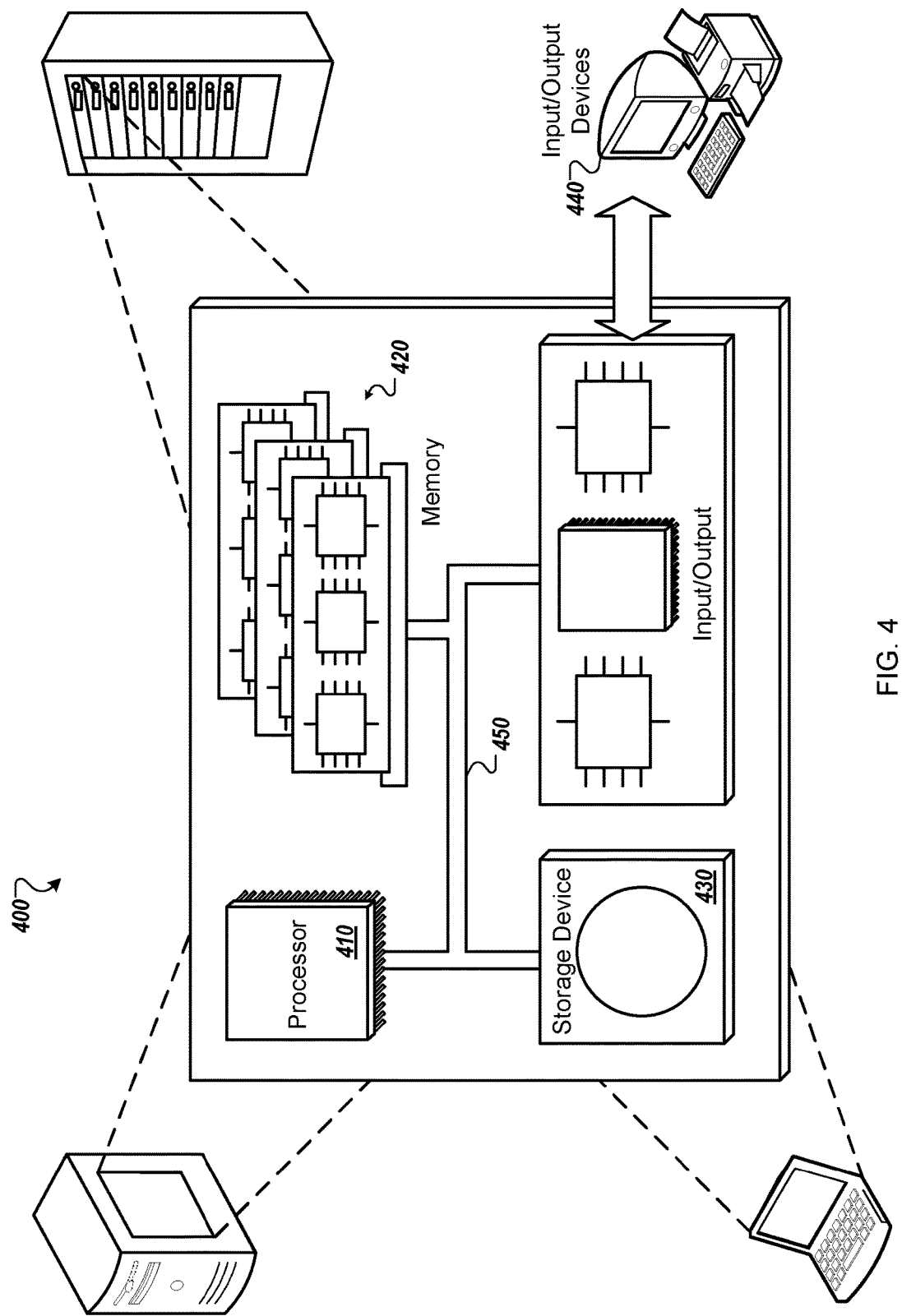
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system, comprising:
   a data processing apparatus; and
   a non-transitory computer readable storage medium in data communication with the data processing apparatus and storing instructions executable by the data processing apparatus and upon such execution cause the data processing apparatus to perform operations comprising:
   for each of two or more requests:
      receiving, by a first computer-implemented agent for a first device from second computer-implemented agent for a second device, the request that identifies one or more constraints for attending the event, wherein the second device is a different device than the first device;
      in response to receiving the request, determining, by the first computer-implemented agent using a profile for a first person who operates first device, whether attributes for the first person satisfy the one or more constraints for attending the event;
      in response to determining that the attributes for the first person satisfy the one or more constraints for attending the event for at least one of the two or more requests, requesting, by the first computer-implemented agent from the second computer-implemented agent, and without sharing data identifying the first person, data defining additional details about the event or a the second person the operates the second device that were not included in the request; and
      in response to determining that at least one of the attributes for the first person does not satisfy a corresponding constraint from the one or more constraints for attending the event for at least one of the two or more requests, determining to skip presentation of information about the event to the first person.

2. The system of claim 1, the operations comprising:
   after receiving data defining the additional details, presenting, by the first computer-implemented agent, data for the request including the additional details about the event or the second person.

3. The system of claim 1, wherein determining, by the first computer-implemented agent using the profile for the first person, whether attributes for the first person satisfy the one or more constraints for attending the event comprises determining, by the first computer-implemented agent using the profile for the first person and a calendar for the first person, whether attributes for the first person satisfy the one or more constraints for attending the event, wherein the calendar for the first person is separate from the profile for the first person.

4. The system of claim 1, the operations comprising:
in response to determining that the attributes for the first person satisfy the one or more constraints for attending the event for at least one of the two or more requests:
determining, by the first computer-implemented agent, privacy settings for the first person;
in response to determining the privacy settings for the first person, determining one or more attributes for the first person that the first computer-implemented agent is permitted to disclose in communications with other computer-implemented agents; and
sending, by the first computer-implemented agent to the second computer-implemented agent, a message that includes data defining some of the one or more attributes for the first person.

5. The system of claim 4, wherein requesting the data defining the additional details about the event or the second person that were not included in the request comprises sending the message that includes the data defining some of the one or more attributes for the first person.

6. The system of claim 1, the operations comprising:
in response to determining that at least one of the attributes for the first person does not satisfy a corresponding constraint from the one or more constraints for attending the event for at least one of the two or more requests, determining to skip sending a message, to the second computer-implemented agent, for data defining additional details about the event or the second person that were not included in the request.

7. The system of claim 1, the operations comprising:
in response to determining that at least one of the attributes for the first person does not satisfy a corresponding constraint from the one or more constraints for attending the event for at least one of the two or more requests, sending, by the first computer-implemented agent to the second computer-implemented agent, a message indicating that the first person will not attend the event with the second person.

8. The system of claim 7, wherein sending, by the first computer-implemented agent to the second computer-implemented agent, the message indicating that the first person will not attend the event with the second person comprises sending a message indicating that the first person does not satisfy some of the one or more constraints for attending the event.

9. The system of claim 1, the operations comprising:
after receiving data defining the additional details, sending, by the first computer-implemented agent to the second computer-implemented agent, a message that includes data defining one or more attributes for the first person that were not identified in the request.

10. The system of claim 1, the operations comprising:
after receiving data defining the additional details, scheduling, by the first computer-implemented agent with the second computer-implemented agent, a time for the event using a calendar for the first person.

11. A computer-implemented method comprising:
for each of two or more requests:
receiving, by a first computer-implemented agent for a first device from second computer-implemented agent for a second device, the request that identifies one or more constraints for attending the event, wherein the second device is a different device than the first device;
in response to receiving the request, determining, by the first computer-implemented agent using a profile for a first person who operates first device, whether attributes for the first person satisfy the one or more constraints for attending the event;
in response to determining that the attributes for the first person satisfy the one or more constraints for attending the event for at least one of the two or more requests, requesting, by the first computer-implemented agent from the second computer-implemented agent, and without sharing data identifying the first person, data defining additional details about the event or a the second person the operates the second device that were not included in the request; and
in response to determining that at least one of the attributes for the first person does not satisfy a corresponding constraint from the one or more constraints for attending the event for at least one of the two or more requests, determining to skip presentation of information about the event to the first person.

12. The method of claim 11, comprising:
after receiving data defining the additional details, presenting, by the first computer-implemented agent, data for the request including the additional details about the event or the second person.

13. The method of claim 11, wherein determining, by the first computer-implemented agent using the profile for the first person, whether attributes for the first person satisfy the one or more constraints for attending the event comprises determining, by the first computer-implemented agent using the profile for the first person and a calendar for the first person, whether attributes for the first person satisfy the one or more constraints for attending the event, wherein the calendar for the first person is separate from the profile for the first person.

14. The method of claim 11, comprising:
in response to determining that the attributes for the first person satisfy the one or more constraints for attending the event for at least one of the two or more requests:
determining, by the first computer-implemented agent, privacy settings for the first person;
in response to determining the privacy settings for the first person, determining one or more attributes for the first person that the first computer-implemented agent is permitted to disclose in communications with other computer-implemented agents; and
sending, by the first computer-implemented agent to the second computer-implemented agent, a message that includes data defining some of the one or more attributes for the first person.

15. The method of claim 14, wherein requesting the data defining the additional details about the event or the second person that were not included in the request comprises sending the message that includes the data defining some of the one or more attributes for the first person.

16. The method of claim 11, comprising:
in response to determining that at least one of the attributes for the first person does not satisfy a corresponding constraint from the one or more constraints for attending the event for at least one of the two or more requests, determining to skip sending a message, to the second computer-implemented agent, for data defining additional details about the event or the second person that were not included in the request.

17. The method of claim 11, comprising:
in response to determining that at least one of the attributes for the first person does not satisfy a corresponding constraint from the one or more constraints for attending the event for at least one of the two or more requests, sending, by the first computer-implemented agent to the second computer-implemented agent, a message indicating that the first person will not attend the event with the second person.

18. The method of claim 17, wherein sending, by the first computer-implemented agent to the second computer-implemented agent, the message indicating that the first person will not attend the event with the second person comprises sending a message indicating that the first person does not satisfy some of the one or more constraints for attending the event.

19. The method of claim 11, comprising:
after receiving data defining the additional details, sending, by the first computer-implemented agent to the second computer-implemented agent, a message that includes data defining one or more attributes for the first person that were not identified in the request.

20. A non-transitory computer readable storage medium storing instructions executable by a data processing apparatus and that upon such execution cause the data processing apparatus to perform operations comprising:
for each of two or more requests:
receiving, by a first computer-implemented agent for a first device from second computer-implemented agent for a second device, the request that identifies one or more constraints for attending the event, wherein the second device is a different device than the first device;
in response to receiving the request, determining, by the first computer-implemented agent using a profile for a first person who operates first device, whether attributes for the first person satisfy the one or more constraints for attending the event;
in response to determining that the attributes for the first person satisfy the one or more constraints for attending the event for at least one of the two or more requests, requesting, by the first computer-implemented agent from the second computer-implemented agent, and without sharing data identifying the first person, data defining additional details about the event or a the second person the operates the second device that were not included in the request; and
in response to determining that at least one of the attributes for the first person does not satisfy a corresponding constraint from the one or more constraints for attending the event for at least one of the two or more requests, determining to skip presentation of information about the event to the first person.

* * * * *